United States Patent
Westergaard Andersen et al.

(10) Patent No.: US 12,134,522 B2
(45) Date of Patent: Nov. 5, 2024

(54) MODULAR CONVEYOR BELT LINK

(71) Applicant: AMMERAAL BELTECH MODULAR A/S, Vejle (DK)

(72) Inventors: Kenneth Westergaard Andersen, Vejle (DK); Germ Buter, Alkmaar (NL)

(73) Assignee: AMMERAAL BELTECH MODULAR A/S, Vejle (DK)

( * ) Notice: Subject to any disclaimer, the term of this patent is extended or adjusted under 35 U.S.C. 154(b) by 0 days.

(21) Appl. No.: 17/607,963

(22) PCT Filed: May 1, 2020

(86) PCT No.: PCT/DK2020/050121
§ 371 (c)(1),
(2) Date: Nov. 1, 2021

(87) PCT Pub. No.: WO2020/224735
PCT Pub. Date: Nov. 12, 2020

(65) Prior Publication Data
US 2022/0281689 A1    Sep. 8, 2022

(30) Foreign Application Priority Data
May 3, 2019    (DK) .......................... PA 2019 70287

(51) Int. Cl.
*B65G 17/08*    (2006.01)
*B65G 23/06*    (2006.01)

(52) U.S. Cl.
CPC ........... *B65G 17/086* (2013.01); *B65G 23/06* (2013.01); *B65G 2207/24* (2013.01)

(58) Field of Classification Search
CPC .. B65G 17/086; B65G 23/06; B65G 47/5113; B65G 47/5177; B65G 2207/27
See application file for complete search history.

(56) References Cited

U.S. PATENT DOCUMENTS

| 4,901,844 A | 2/1990 | Palmaer et al. |
| 5,310,045 A * | 5/1994 | Palmaer ................. B65G 21/18 198/834 |

(Continued)

FOREIGN PATENT DOCUMENTS

| CA | 2093807 A1 | 4/1992 |
| CN | 1721299 A | 1/2006 |

(Continued)

OTHER PUBLICATIONS

International Search Report for PCT/DK2020/050121 mailed Aug. 25, 2020.

(Continued)

*Primary Examiner* — James R Bidwell
*Assistant Examiner* — Abby A Jorgensen
(74) *Attorney, Agent, or Firm* — Schmeiser, Olsen & Watts, LLP

(57) ABSTRACT

Provided is a conveyor belt link, of the type used in endless conveyor belts assembled from a plurality of such modular conveyor belt links, where the modular conveyor belt link has a main body extending in the modular belt link's width direction, and where a plurality of eye parts extend forwards and rearwards from the main body, the eye parts being spaced in the width direction of the modular belt link, where forwards extending eye parts are offset relative to rearwards extending eye parts, such that when two modular conveyor belt links are pushed together the eye parts on one link will inter-fit between eye parts on the other modular belt link, wherein the modular belt link laterally is limited by two sides, and that the outermost eye parts on either side are provided with a cutout, such that the width of the modular conveyor belt link is smaller in the cutout than outside the cutout.

11 Claims, 4 Drawing Sheets

(56) References Cited

U.S. PATENT DOCUMENTS

| | | | |
|---|---|---|---|
| 5,775,480 A * | 7/1998 | Lapeyre | B65G 17/086 |
| | | | 198/852 |
| 9,815,630 B1 * | 11/2017 | Coto | B65G 23/44 |
| 2002/0129481 A1 | 9/2002 | Palmaer et al. | |
| 2003/0075419 A1 | 4/2003 | Ayne et al. | |
| 2008/0023304 A1 | 1/2008 | Elsner | |
| 2009/0308716 A1 | 12/2009 | Marsetti | |
| 2011/0017576 A1 * | 1/2011 | Andersen | B65G 17/086 |
| | | | 198/837 |
| 2013/0068595 A1 * | 3/2013 | Layne | B65G 17/086 |
| | | | 198/834 |
| 2014/0131177 A1 | 5/2014 | Delair | |
| 2014/0231226 A1 | 8/2014 | Sharma et al. | |
| 2016/0272428 A1 * | 9/2016 | Andersen | B65G 17/086 |
| 2019/0016535 A1 * | 1/2019 | Elsner | B65G 17/086 |

FOREIGN PATENT DOCUMENTS

| | | | | |
|---|---|---|---|---|
| CN | 101336199 A | 12/2008 | | |
| CN | 104271473 A | 1/2015 | | |
| CN | 107352231 A | 11/2017 | | |
| CN | 108025874 A | 5/2018 | | |
| EP | 2030917 A1 * | 3/2009 | | B65G 17/086 |
| EP | 3456664 A1 * | 3/2019 | | B65G 17/068 |
| WO | WO-2013142136 A1 * | 9/2013 | | B65G 15/02 |
| WO | WO-2014076164 A1 * | 5/2014 | | B65G 17/086 |

OTHER PUBLICATIONS

Written Opinion for PCT/DK2020/050121 mailed Aug. 25, 2020.
Danish Office Action dated Sep. 23, 2019 for Application No. PA 2019 70287.

* cited by examiner

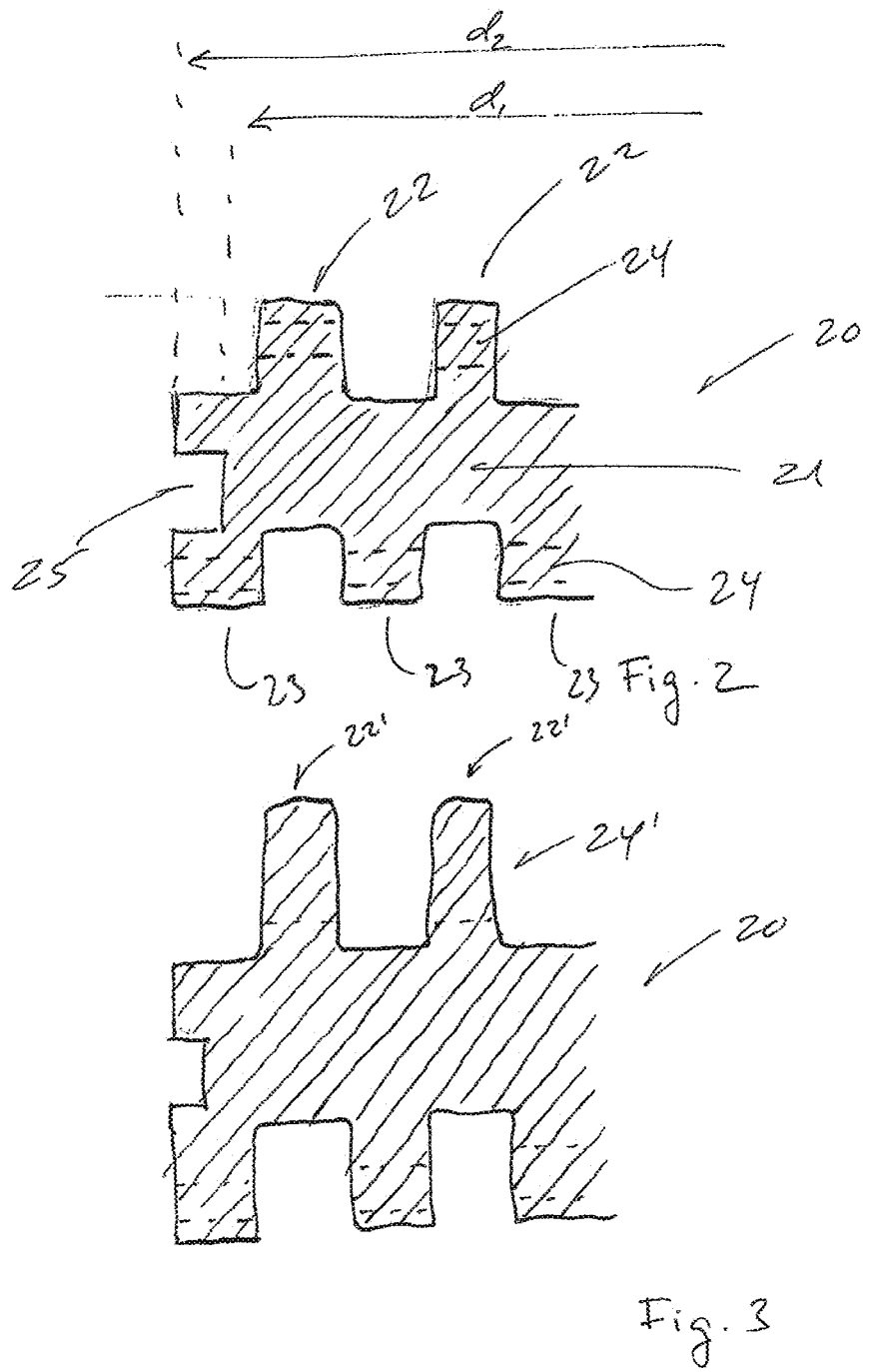

MODULAR CONVEYOR BELT LINK

CROSS-REFERENCE TO RELATED APPLICATIONS

This application claims priority to PCT Application No. PCT/DK2020/050121, having a filing date of May 1, 2020, which is based DK Application No. PA 2019 70287, having a filing date of May 3, 2019, the entire contents both of which are hereby incorporated by reference.

FIELD OF TECHNOLOGY

The following relates to a modular conveyor belt link, an endless conveyor assembled from a plurality of modular conveyor belt links as well as a spiral conveyor structure where the conveyor belt is made from a plurality of modular belt links.

BACKGROUND

In the art, spiral conveyors are used to convey goods along a helically formed conveyor path. The conveyor belt will follow a conveying path around a drive tower. By this design of the conveyor is achieved that a relatively large conveyor belt area may be provided on a relatively small floor area. These types of conveyors are often used in combination with freezing installations or bakery installations such that the entire spiral conveyor is enclosed inside a housing where the desired process takes place.

SUMMARY

In order to be able to transport a relatively high load it is necessary to obtain a firm connection between the drive means, typically in the shape of a drive tower arranged centrally inside the spiral conveyor and the conveyor belt, such that by rotating the drive tower the rotational forces will be transferred to the conveyor belt thereby moving the conveyor belt and thereby the objects through the spiral conveyor along the conveying path.

Embodiments of the present invention provide a novel solution to this engagement between the conveyor belt and the spiral conveyor drive tower by using the modular conveyor belt link of the type used in endless conveyor belts assembled from a plurality of such modular conveyor belt links, where the modular conveyor belt link has a main body extending in the modular belt link's width direction, and where a plurality of eye parts extend forwards and rearwards from the main body, the eye parts being spaced in the width direction of the modular belt link, where forwards extending eye parts are offset relative to rearwards extending eye parts, such that when two modular conveyor belt links are pushed together the eye parts on one link will inter-fit between eye parts on the other modular belt link, where the modular belt link laterally is limited by two sides, and that the outermost eye parts on either side are provided with a cutout the cut-out spanning the entire thickness of the modular belt link from the load carrying surface to the underside, such that the width of the modular conveyor belt link is smaller in the cutout than outside the cutout.

The cutout in the sides of the modular conveyor belt link provides a well-defined engagement point where engagement members, for example provided on a spiral conveyor drive tower, may positively engage the modular conveyor belt link and transfer the propulsion forces from the drive tower to the modular conveyor belt link. The type of conveyor belts used in spiral conveyors are of the side flexing type, meaning that the conveyor belt will be able to flex to either side in a lateral plane. When the conveyor belt flexes to one side, the belt will collapse along the inner periphery, and be extended along the outer periphery.

Examples of such side-flexing conveyor belts are disclosed in US 2014/0231226, US 2008/0023304 and many others.

Usually, the inner side in the collapsed state will be substantially continuous in that adjacent outer eye parts along the periphery of adjacent rows of belt links, will be in contact. However, with embodiments of the present invention, where a cut-out is provided spanning through the entire thickness of the modular belt link, the cut-out provides an opening in which engagement means provided on the outside of the drive tower may engage, and thereby positively drive the conveyor belt along the helical path.

Also, for embodiments where the drive tower does not have positive drive means, the inner side surface of the modular belt links will be able to frictionally engage the periphery of the drive tower and thereby be propelled through the spiral conveyor.

In a further embodiment, the modular conveyor belt link has an upper carrying surface where the eye parts are provided with apertures parallel to the carrying surface, such that apertures in one eye part may be overlapped with apertures in eye parts from adjacent modular conveyor belt links, and a connection pin may be inserted through the overlapping apertures thereby creating a hinge-like connection between adjacent modular belt links.

The hinge-like connection provides the added advantage that it is possible to bend the conveyor belt out of a plane which is well-known in the art. Particularly for spiral conveyor belts these will alter orientation a number of times when going through the conveying path and as such this is an important aspect for this type of modular conveyor belt links.

In a still further embodiment, the apertures at least in eye parts on one side of the main body are oblong with the long axis of the aperture oriented in the intended transport direction for the endless conveyor belt into which the modular belt link is to be assembled. In this manner the modular conveyor belt link is suitable to be assembled in an endless conveyor belt where the oblong apertures allow the conveyor belt to side-flex and thereby firmly adapt to the conveying path, particularly in a spiral conveyor. In embodiments, an outermost eye part orthogonal to the carrying surface and a section facing away from a side has a material thickness of 20% to 70% of the entire modular conveyor belt link in the same direction, and an adjacent eye part on a opposite side of the main body on a section facing towards the side has a material thickness of 70% to 20% of the material thickness in that direction, such that the sections on either eye part on adjacent modular conveyor belt links may overlap.

It is also foreseen that the eye parts, at least the outermost eye parts, have reduced material thickness orthogonally to the carrying surface such that the eye parts may slide over adjacent eye parts in modular belt links in front or to the rear. In this manner the side of the conveyor will not have gaps in which engagement members on the drive tower may be lodged, and furthermore the conveyor belt may not be diverted from the conveying belt guide path, due to a gap in the conveyor.

Embodiments of the invention are also directed to an endless conveyor belt assembled from a plurality of modular conveyor belt links as described above.

In embodiments, the modular conveyor belt link discussed above is particularly designed for use in a spiral conveyor structure where the spiral conveyor structure comprises a drive tower having a bottom and a top and engagement means extending between the bottom and top, where the drive tower rotates around a vertical axis;

wherein the engagement means extends a distance from the vertical rotation axis, where the distance varies at least for a part of the distance between the bottom and the top;

a spiral pathway arranged outside the drive tower;

an endless modular conveyor belt assembled from a plurality of modular belt links arranged on the pathway, wherein an outer end of the engagement means engages the cutout provided in the innermost side of a modular belt link, such that as the drive tower rotates, the modular belt link and thereby the endless conveyor belt is pushed along the spiral pathway.

The engagement means provided substantially vertically on the drive tower are designed such that they will engage the cutout in the side-surfaces of the modular belt links and in this manner provide a positive engagement directly between the engagement means and the modular conveyor belt link. This feature provides a very well-defined engagement and also provides the possibility of transferring relatively large propulsion forces to the endless conveyor assembled from a plurality of modular conveyor belt links as described above.

BRIEF DESCRIPTION

Some of the embodiments will be described in detail, with references to the following Figures, wherein like designations denote like members, wherein:

FIG. 2 shows schematic modular conveyor belt links according to an embodiment of the invention;

FIG. 3 shows schematic modular conveyor belt links according to a further embodiment of the invention;

DETAILED DESCRIPTION

Figure 1:
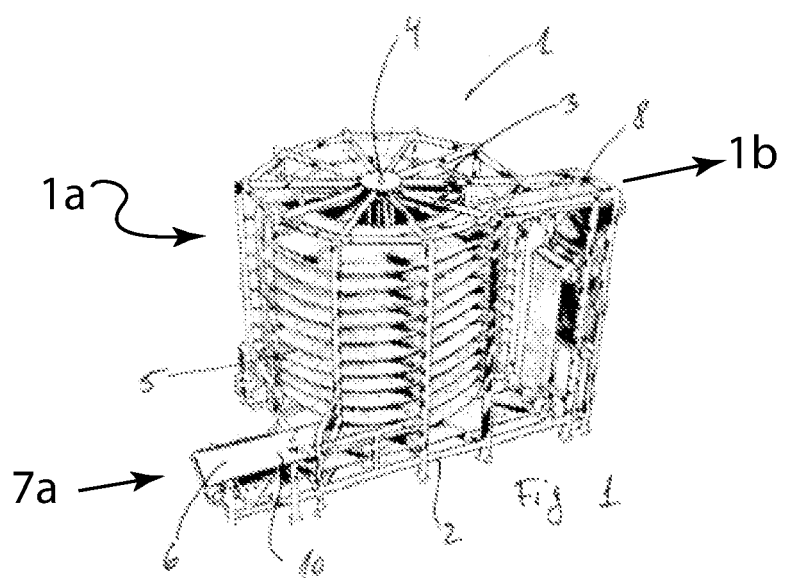
FIG. 1 shows a typical spiral conveyor construction.

In FIG. 1 is illustrated a typical spiral conveyor construction comprising a frame structure 2 suitable to be placed on a floor of a manufacturing facility. Inside the frame structure 2 is provided a drive tower 3 which drive tower has a top and a bottom and where the drive tower 3 is arranged for rotation around a substantially vertical axis 4.

On the outside of the drive tower 3 is provided a conveying path 5. When an object is placed on the conveyor belt, at the entrance 6 to the spiral conveyor working in the direction as indicated by the arrow 7a, the object will be transported on a conveyor 10 through the spiral conveyor along 30 the spiral/helical conveying path 5 and finally be arriving at the outlet 8 where the object transported by the spiral conveyor 1 will be ready for further processing by leaving the spiral conveyor 1 as indicated by the arrow 1b.

As may be seen by the illustration the conveyor belt 10 is relatively long in that the spirals of the spiral path 5 circumvents the drive tower a number of times enlarging the effective conveying area compared to the area which the structure 1 takes up in a production facility. Furthermore, the drive tower 3 needs to engage the side of the conveyor belt 10 in order to propel the conveyor belt and the objects through the spiral part 1a of the conveying structure 1.

In FIGS. 2 and 3 are illustrated schematic embodiments of modular conveyor belt links according to embodiments of the invention.

In FIG. 2 the modular belt link 20 has a main body 21 which in this embodiment is illustrated as a solid slab. In other embodiments the main body may be perforated such that any water may drain from the surface or the main body may be very thin just being a beam going across the width of the modular conveyor belt link.

Eye parts 22 are extending forwardly from the body 21 and similarly rearwards facing eye parts 23 are extending in a rearward direction. The eye parts 22, 23 are offset such that eye parts facing forwards 22 may be inter-fitted between adjacent eye parts 23 facing rearwards. In this manner it is possible to create a large conveyor belt by inter-fitting substantially identical conveyor belt links in this manner.

The eye parts 22, 23 are also provided with a lateral aperture 24 (illustrated by dashed lines) such that by inserting the eye parts 22, 23 in the openings between the rearwards extending eye parts 23 it is possible to make the lateral apertures 24 overlap and insert a connection pin (not illustrated).

In this embodiment the outermost eye part 23 is provided with a cut-out 25 such that the width of the modular conveyor belt link D1 is smaller in the cut-out than the entire width D2 of the belt link. As the modular conveyor belt link 20 is assembled into an endless conveyor belt as described above with reference to FIG. 2 engagement means on the drive tower will be able to engage the cut-out 25 on the modular conveyor belt links and in this manner positively engage and drive the endless conveyor belt along the drive tower.

In FIG. 3 is illustrated a further embodiment, however, in this embodiment the apertures 24' (still illustrated by dashed lines) are oblong such that the longitudinal direction of the aperture is oriented in the intended travelling direction of the conveyor belt. It will therefore be possible when adjacent belt links are assembled as described above with reference to inserting a connecting pin through overlapping apertures for the connecting pin to move in the travelling direction inside the oblong aperture 24' provided in the forward-facing eye parts 22'. In this manner a side-flexing conveyor belt is constructed.

Figure 4:
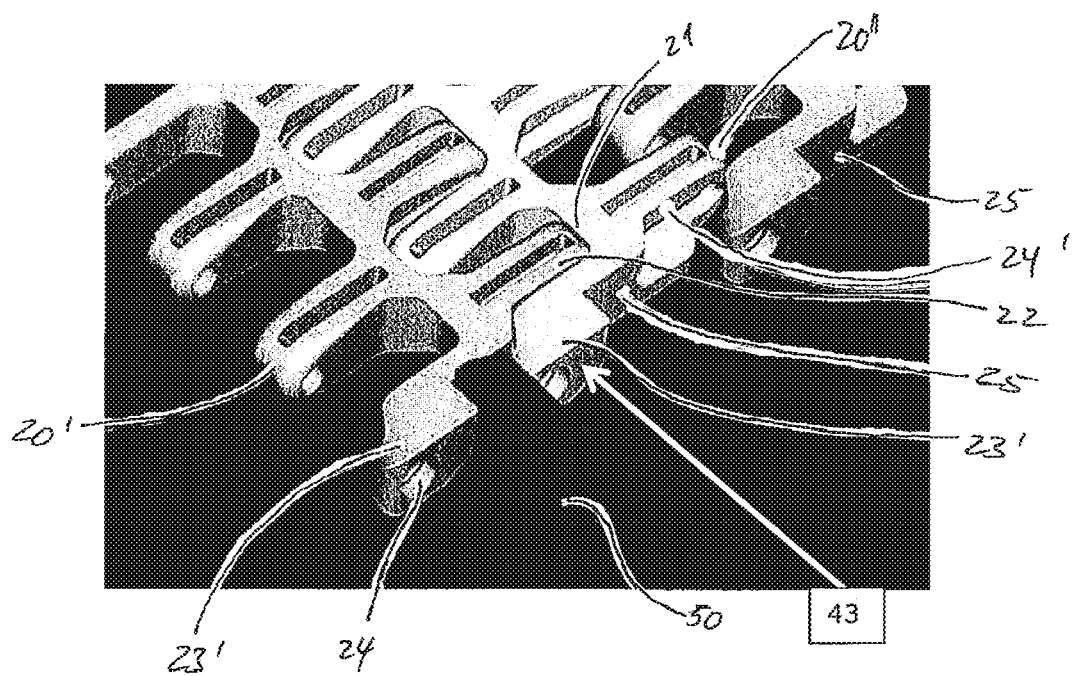
FIG. 4 shows a further embodiment of the invention where adjacent modular conveyor belt links are assembled to a conveyor belt.

In FIG. 4 is illustrated a further embodiment of the invention where adjacent modular conveyor belt links 20', 20" are illustrated in an assembled manner. The modular belt links are identical and in this embodiment the outermost eye part 23' is provided with a cut-out which allows the engagement member 50 on the drive tower (not illustrated) to engage the cut-out and positively drive the conveyor belt.

In this embodiment the cut-out is not a slit as it was in the embodiments illustrated above with reference to FIGS. 2 and 3, but is a cut-out where part of the material in the outermost eye part has been removed such that the outermost eye part 23' of an adjacent outer eye part of a further modular belt link may overlap the first outer eye part 23'.

As may be further seen from FIG. 4 the belt links are dimensioned such that the forwards extending eye parts 22 engage the bottom/main body 21 of the adjacent modular belt link and in this manner ensures that the cut-out 23' is free for the engagement member 50 to engage and drive the conveyor belt. In this embodiment the forward-facing eye parts 22 are provided with oblong apertures 24' whereas the rearward facing eye parts are provided with circular apertures 24.

Furthermore, the outer side surface 43 (see also FIGS. 2 and 3) of the conveyor belt in the shape of outside side surfaces 43 of the modular belt links, may also be used to transfer propulsion force from a drive tower to the endless belt. In the art of spiral conveyors there are generally two concepts of transferring power from the drive tower to an endless belt: positive drive and friction drive. In FIG. 4 for example is illustrated positive drive. By this concept shall be understood that the endless conveyor is provided with means, typically notches, ribs or the like which are provided and suitable to engage means on the drive tower, such that there are determined engagement positions between the endless conveyor belt and the drive tower. In the other type—friction—an outer surface on the drive tower will frictionally engage a side face of the conveyor belt. Due to the tension in the belt surrounding (causing a slight squeezing) the drive tower and the friction against the drive tower, the frictional engagement will transfer propulsion force to the endless conveyor belt.

Figure 5:
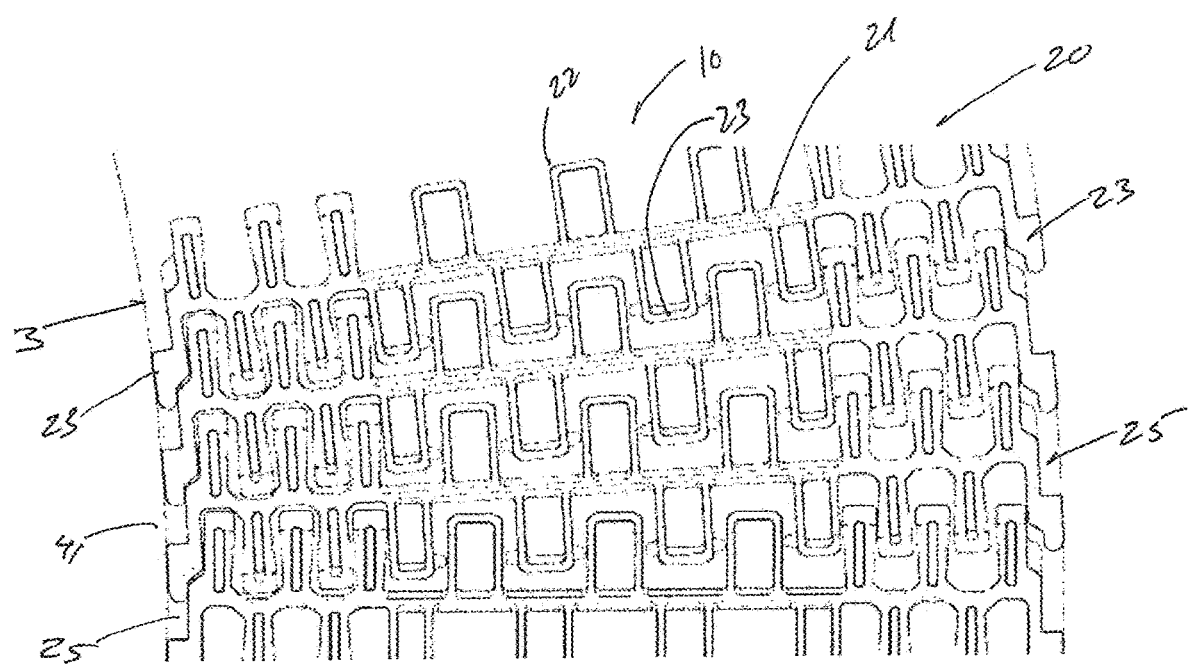
FIG. 5 shows a plane view of an endless conveyor belt assembled from a plurality of modular conveyor belt links.

In FIG. 5 is illustrated a plane view of an endless conveyor belt 10 assembled from a plurality of modular conveyor belt links 20 according to embodiments of the invention. Each modular 5 conveyor belt link 20 has a main body 21 from which main body 21 eye parts 22, 23 extend in forwards and rearwards directions.

The outermost eye parts 23 in both sides of the conveyor belt are provided with cut-outs 25 such that engagement means (not illustrated) on the drive tower 3 may engage and propel the conveyor belt 10 along the conveying path 5 (see FIG. 1). The depth 41 of the cut-out illustrated by the arrow is sufficient for the engagement member 50, see FIG. 4, to be inserted in the cut-out 25 sufficiently to attain a firm contact with the conveyor belt and as such be able to drive the conveyor belt in the desired direction.

As is evident from FIG. 5 the side of the conveyor belt closer to the drive tower 3 is collapsed such that the distance between adjacent eye parts along the inner side is substantially smaller than the same distance along the outer side of the conveyor belt. This is due to the provision of the elongated eye parts 24' as explained with reference to FIG. 3.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A modular conveyor belt link, used in an endless conveyor belt assembled from a plurality of such modular conveyor belt links, where the endless conveyor belt has a load carrying surface and an underside opposite the load carrying surface, where the modular conveyor belt link has a main body extending in the modular conveyor belt link's width direction, and wherein the main body has a plurality of eye parts that extend forwards and rearwards, the plurality of eye parts being spaced in the width direction of the modular conveyor belt link, where forwards extending eye parts of the plurality of eye parts are offset relative to rearwards extending eye parts of the plurality of eye parts, such that when the modular conveyor belt link is pushed together with a second modular conveyor belt link the plurality of eye parts on the modular conveyor belt link will inter-fit between the plurality of eye parts on the second modular conveyor belt link, wherein the modular conveyor belt link laterally is limited by two sides, and outermost eye parts of the plurality of eye parts on either side are provided with a cutout, the cutout spanning an entire thickness of the modular conveyor belt link from the load carrying surface to the underside, such that the width of the modular conveyor belt link is smaller in the cutout than outside the cutout, where the cutout has an engagement surface spanning from the load carrying surface to the underside, the engagement surface is orthogonal to the two sides, and where the engagement surface is suitable to engage a drive member, wherein the plurality of eye parts are provided with apertures parallel to the load carrying surface, such that the apertures in one eye part may be overlapped with the apertures in the plurality of eye parts from adjacent modular conveyor belt links, and a connection pin may be inserted through the overlapping apertures thereby creating a hinge-like connection between the adjacent modular conveyor belt links, wherein the outermost eye parts have reduced material thickness orthogonally to the load carrying surface such that the outermost eye parts on one modular belt link may slide over adjacent outermost eye parts on adjacent modular belt links in the forwards and rearwards direction from the main body such that inner sides of the respective modular belt links are in a collapsed state while outer sides of the respective modular belt links are in an expanded state, and wherein the engagement surface of the cutout is suitable to engage the drive member in the collapsed state.

2. The modular conveyor belt link according to claim 1, wherein the apertures at least in the plurality of eye parts on one side of the main body are oblong with a long axis of the aperture oriented in an intended transport direction for the endless conveyor belt into which the modular conveyor belt link is to be assembled.

3. The modular conveyor belt link according to claim 1, wherein the first material thickness comprises 20% to 70% of the entire modular conveyor belt link and wherein the second material thickness comprises 70% to 20% of the material thickness of the entire modular conveyor belt link.

4. An endless conveyor belt assembled from a plurality of modular conveyor belt links according to claim 1.

5. A spiral conveyor structure comprising:
  a drive tower having a bottom and a top and an engagement means extending between the bottom and top, where the drive tower rotates around a vertical axis;
  wherein the engagement means extends a distance from the vertical axis, where the distance varies at least for a part of the distance between the bottom and the top;
  a spiral pathway arranged outside the drive tower; and
  an endless modular conveyor belt assembled from a plurality of modular conveyor belt links according to claim 1 arranged on the spiral pathway, wherein an outer end of the engagement means engages the cutout provided in the innermost side of at least one modular conveyor belt link of the plurality of modular conveyor belt links, such that as the drive tower rotates, the at least one modular conveyor belt link and thereby the endless modular conveyor belt is pushed along the spiral pathway.

6. The spiral conveyor structure according to claim 5, wherein the engagement means on the drive tower comprises a rib which positively engages the cutout in the sides of the plurality of modular conveyor belt links making up the endless modular conveyor belt in order to positively transfer propulsion force from the drive tower to the endless modular conveyor belt.

7. The spiral conveyor structure according to claim 5, wherein the engagement means on the drive tower may comprise a rib or an engagement surface, the rib or engagement surface frictionally engages outer side surfaces of the endless modular conveyor belt in a shape of outside side surfaces of the plurality of modular conveyor belt links making up the endless modular conveyor belt in order to frictionally transfer the propulsion force from the drive tower to the endless conveyor belt.

8. The modular conveyor belt link according to claim 1, wherein the main body includes a continuous portion extending from the inner side to the outer side in a substantially straight line, wherein the continuous portion forms part of the load carrying surface.

9. A modular conveyor belt link for an endless conveyor belt, comprising:
   a main body extending from an inner side to an outer side, wherein the main body forms a load carrying surface and an underside opposite the load carrying surface,
   a plurality of forward-facing eye parts and a plurality of rearward-facing eye parts extending from the main body, wherein respective forward-facing eye parts of the plurality of eye parts are offset relative to respective rearward-facing eye parts of the plurality of eye parts such that when the modular conveyor belt link is pushed together with a second modular conveyor belt link the plurality of eye parts on the modular conveyor belt link will inter-fit between a second plurality of eye parts on the second modular conveyor belt link and a connection pin may be inserted through the eye parts thereby creating a hinge-like connection between the adjacent modular conveyor belt links, wherein outermost eye parts have reduced material thickness orthogonally to the load carrying surface to allow the outermost eye parts on the modular belt link to slide over adjacent outermost eye parts on the second modular belt link such that the outermost eye parts on the inner side of the modular belt link and outermost eye parts on an inner side of the second modular belt link are allowed to be a collapsed state while outermost eye parts on the outer side of the modular belt link and outermost eye parts on an outer side of the second modular belt link are allowed to be an expanded state,
   a cutout, wherein the cutout is positioned on the inner side of the main body or is at least partially formed by a respective outermost eye part on the inner side of the modular belt link and a respective outermost eye part on the inner side of the second modular belt link, the cutout spanning an entire thickness of the modular conveyor belt link from the load carrying surface to the underside opposite the load carrying surface, such that a cutout width of the modular conveyor belt link is smaller in the cutout than outside the cutout, where the cutout has an engagement surface spanning from the load carrying surface to the underside, the engagement surface is orthogonal to the inner side and to the outer side, wherein the engagement surface is suitable to engage a drive member, and wherein the cutout is present in the collapsed state and the engagement surface is suitable to engage the drive member in the collapsed state.

10. The modular conveyor belt link according to claim 9, wherein the plurality of eye parts are provided with apertures parallel to the load carrying surface and the connection pin may be inserted through the apertures thereby creating the hinge-like connection.

11. The modular conveyor belt link according to claim 10, wherein the apertures in at least a portion of the plurality of eye parts on one side of the main body are oblong with a long axis of the aperture oriented in an intended transport direction.

\* \* \* \* \*